(12) United States Patent
Di Maio et al.

(10) Patent No.: US 10,873,185 B2
(45) Date of Patent: Dec. 22, 2020

(54) SUBSEA ELECTRIC POWER DISTRIBUTION INSTALLATION

(71) Applicant: ABB Schweiz AG, Baden (CH)

(72) Inventors: Luciano Di Maio, Milan (IT); Dukkaiappan Subbiah Thevar, Dusseldorf (DE); Pravin A. Futane, Bergen (NO); Marco Testa, Dalmine (IT); Johan Gunnar, Frekhaug (NO); Kai Tormod Hansen, Oslo (NO)

(73) Assignee: ABB Schweiz AG, Baden (CH)

( * ) Notice: Subject to any disclaimer, the term of this patent is extended or adjusted under 35 U.S.C. 154(b) by 21 days.

(21) Appl. No.: 16/313,509

(22) PCT Filed: May 16, 2017

(86) PCT No.: PCT/EP2017/061672
§ 371 (c)(1),
(2) Date: Dec. 27, 2018

(87) PCT Pub. No.: WO2018/001616
PCT Pub. Date: Jan. 4, 2018

(65) Prior Publication Data
US 2019/0319457 A1 Oct. 17, 2019

(30) Foreign Application Priority Data
Jun. 27, 2016 (EP) ..................... 16176344

(51) Int. Cl.
*H02J 3/32* (2006.01)
*H02J 7/00* (2006.01)
*H02J 9/06* (2006.01)
(52) U.S. Cl.
CPC ............ *H02J 3/32* (2013.01); *H02J 7/0013* (2013.01); *H02J 9/061* (2013.01)

(58) Field of Classification Search
CPC ............ H02J 3/32; H02J 7/0013; H02J 9/061
See application file for complete search history.

(56) References Cited

U.S. PATENT DOCUMENTS 6,732,469 B2 * 5/2004 Lindgren ............... A01K 85/01
362/158
2013/0188402 A1 7/2013 Boe
(Continued)

FOREIGN PATENT DOCUMENTS

WO 2014116257 A1 7/2014

OTHER PUBLICATIONS

European Patent Office, International Search Report & Written Opinion issued in corresponding Application No. PCT/EP2017/061672, dated Jul. 5, 2017, 12 pp.
(Continued)

*Primary Examiner* — Carlos Amaya
(74) *Attorney, Agent, or Firm* — Taft Stettinius & Hollister LLP; J. Bruce Schelkopf

(57) ABSTRACT

A subsea electric power distribution installation including: one or more MV switching apparatuses electrically connected with an electric power source an one or more electric loads, the switching apparatuses being adapted to switch a MV electric power supply to the electric loads; electronic equipment operatively associated with the switching apparatuses for managing the operation of the switching apparatuses, the electronic equipment being configured to receive a LV electric power supply. The subsea electric power distribution installation includes a centralized energy storage unit including one or more storing devices for storing electric energy to feed the electronic equipment, wherein the centralized energy storage unit is adapted to receive electric power from the electric power source to charge the storing devices, wherein the centralized energy storage unit is adapted to provide an electric power supply to the the
(Continued)

electronic equipment by absorbing electric power from the storing devices.

18 Claims, 9 Drawing Sheets

(56) References Cited

U.S. PATENT DOCUMENTS

2013/0286546 A1\* 10/2013 Hazel ..................... H02B 1/26
    361/602
2018/0258940 A1\* 9/2018 Chambhare ......... F04D 25/0686

OTHER PUBLICATIONS

European Patent Office, Extended Search Report issued in corresponding Application No. 16176344.6, dated Dec. 13, 2016, 6 pp.

\* cited by examiner

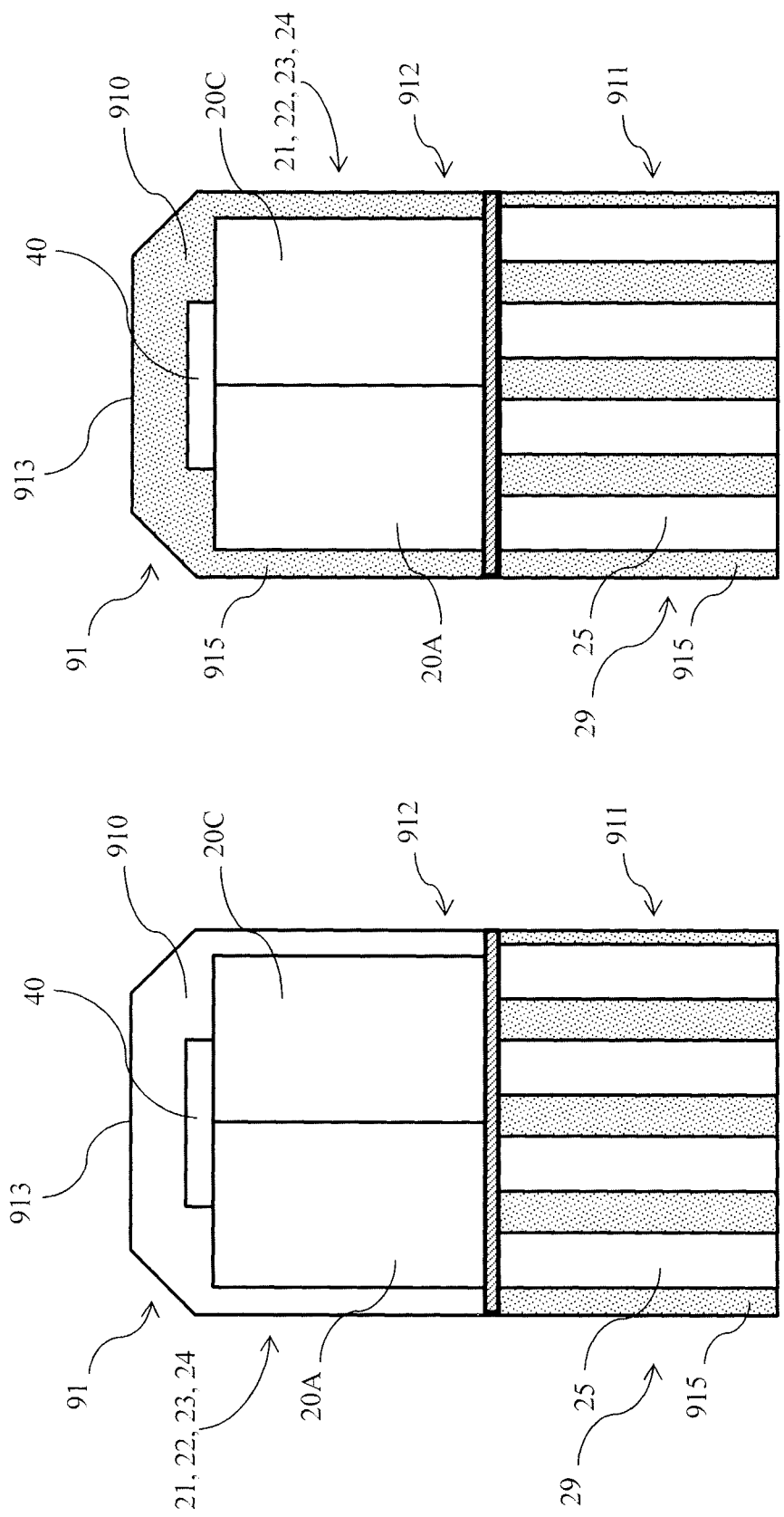

SUBSEA ELECTRIC POWER DISTRIBUTION INSTALLATION

BACKGROUND

The present invention relates to the field of subsea electric power distribution grids for subsea facilities.

More particularly, the present invention relates to a subsea electric power distribution installation providing improved performances in terms of structural simplicity and reliability.

For the purposes of the present invention:
the term "low voltage" (LV) relates to operating voltages at electric power distribution level, which are lower than 1 kV AC and 1.5 kV DC;
the term "medium voltage" (MV) relates to operating voltages at electric power distribution level, which are higher than 1 kV AC and 1.5 kV DC up to some tens of kV, e.g. up to 72 kV AC and 100 kV DC;
the term "high voltage" (HV) relates to operating voltages at electric power transmission level, which are higher than some tens of kV, e.g. higher than 72 kV AC and 100 kV DC.

As is known, in the field of offshore oil and gas production, processing facilities are often installed into deep waters in proximity of subsea wells that may be located in water depths down to 3000 m or more.

Subsea facilities may comprise a range of components, e.g. pumps, compressors and the like, which require electric power for operation.

In order to electrically feed a subsea facility, a HV supply voltage is typically provided to a subsea electric power distribution grid, at which it is transformed to a supply voltage at electric power distribution level to feed a subsea electric power distribution installation.

A subsea electric power distribution installation normally comprises a subsea switchgear including MV switching apparatuses (e.g. vacuum circuit breakers) adapted to switch a MV electric power supply to subsea electric loads (e.g. to subsea electric motors).

A subsea electric power distribution installation further comprises electronic equipment, which is operatively associated to said switching apparatuses to control the operation thereof and which is typically fed with a LV electric power supply.

A drawback of currently available subsea electric power distribution installations resides in their intrinsic complexity.

In fact, the high number of components of these apparatuses makes them difficult and cumbersome to install at deep water level and constitutes a severe limit to their overall reliability.

Obviously, such a criticality is made particularly heavy by the fact that maintenance interventions on subsea installations are extremely complex and expensive to carry out.

Nowadays, it is thus quite felt the demand for subsea electric power distribution installations having structural simplicity and showing improved performances in terms of reliability.

In order to satisfy this need, the present invention provides a subsea electric power distribution installation.

In a further aspect, the present invention provides a subsea electric power distribution grid.

In a further aspect, the present invention provides a centralized energy storage unit for a subsea electric power distribution installation.

BRIEF DESCRIPTION OF THE DRAWINGS

Characteristics and advantages of the present invention will become more apparent from the detailed description of preferred embodiments illustrated only by way of non-limitative example in the accompanying drawings, in which:

FIGS. 5-8 are block diagrams that schematically show a subsea container for the subsea electric power distribution installation, according to the invention;

DESCRIPTION OF THE ILLUSTRATED EMBODIMENTS

Figure 1:
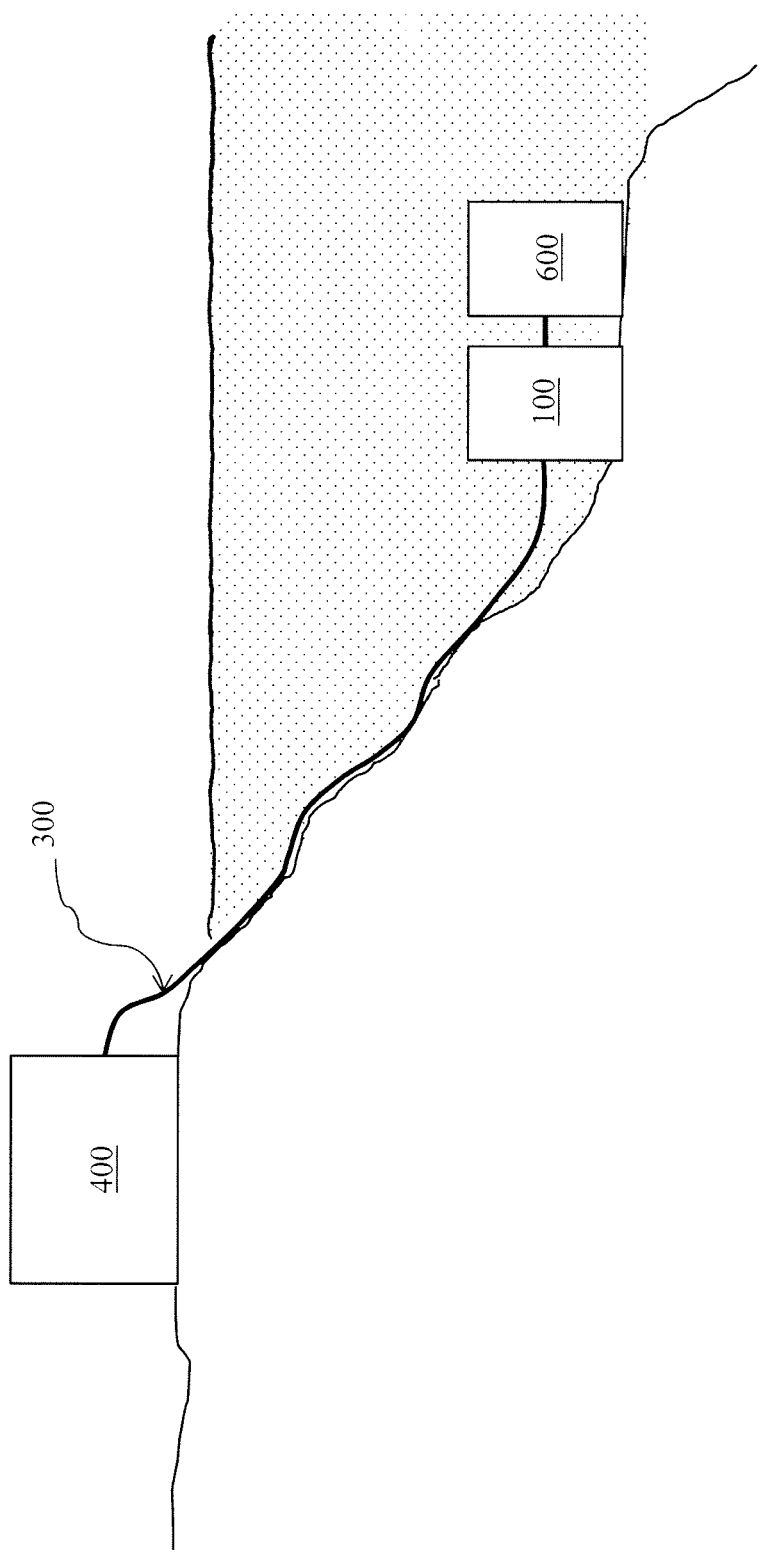
FIGS. 1-2 are block diagrams that schematically show a subsea electric power distribution grid comprising the subsea electric power distribution installation, according to the invention.
Figure 2:
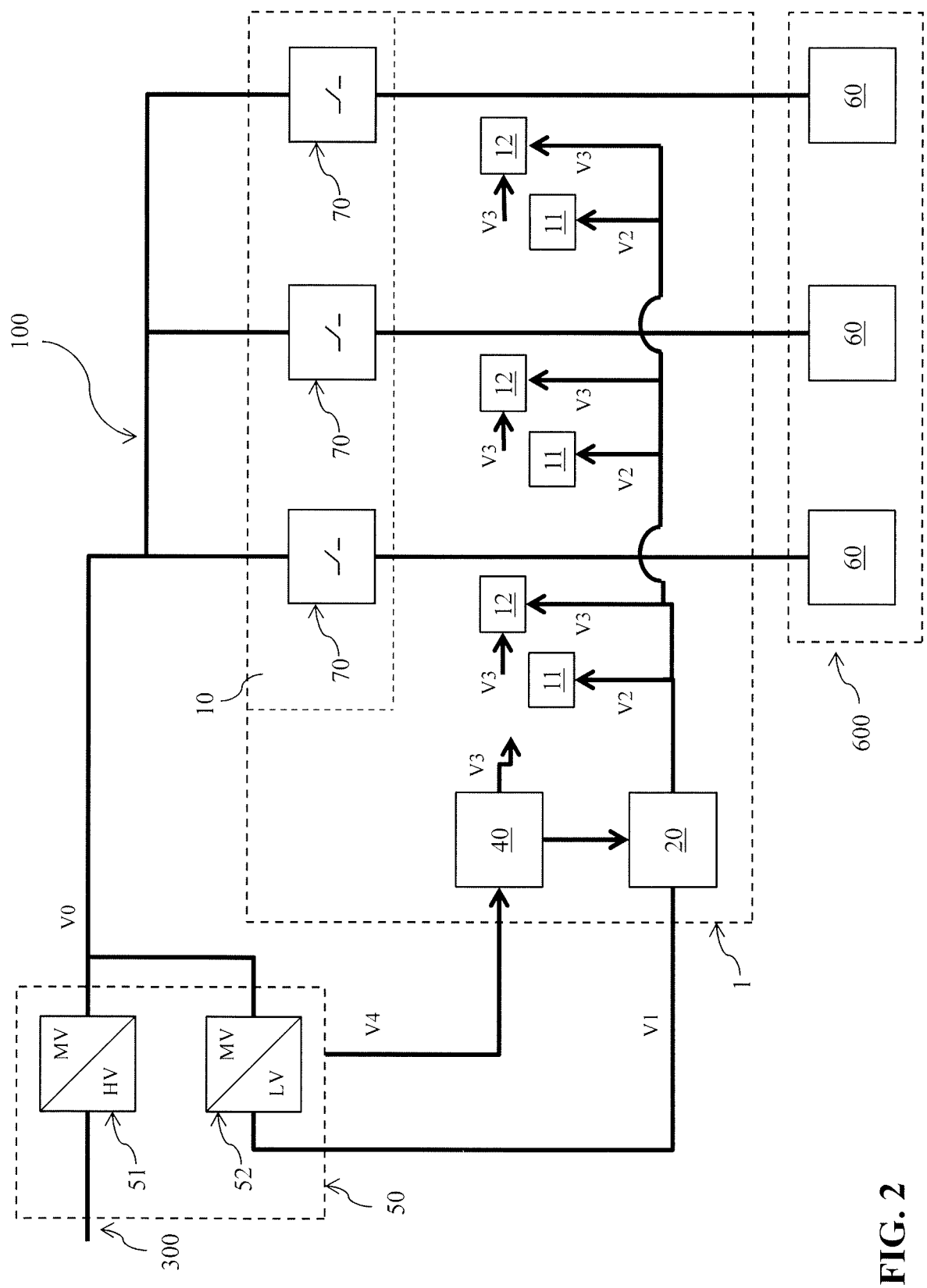
Figure 3:
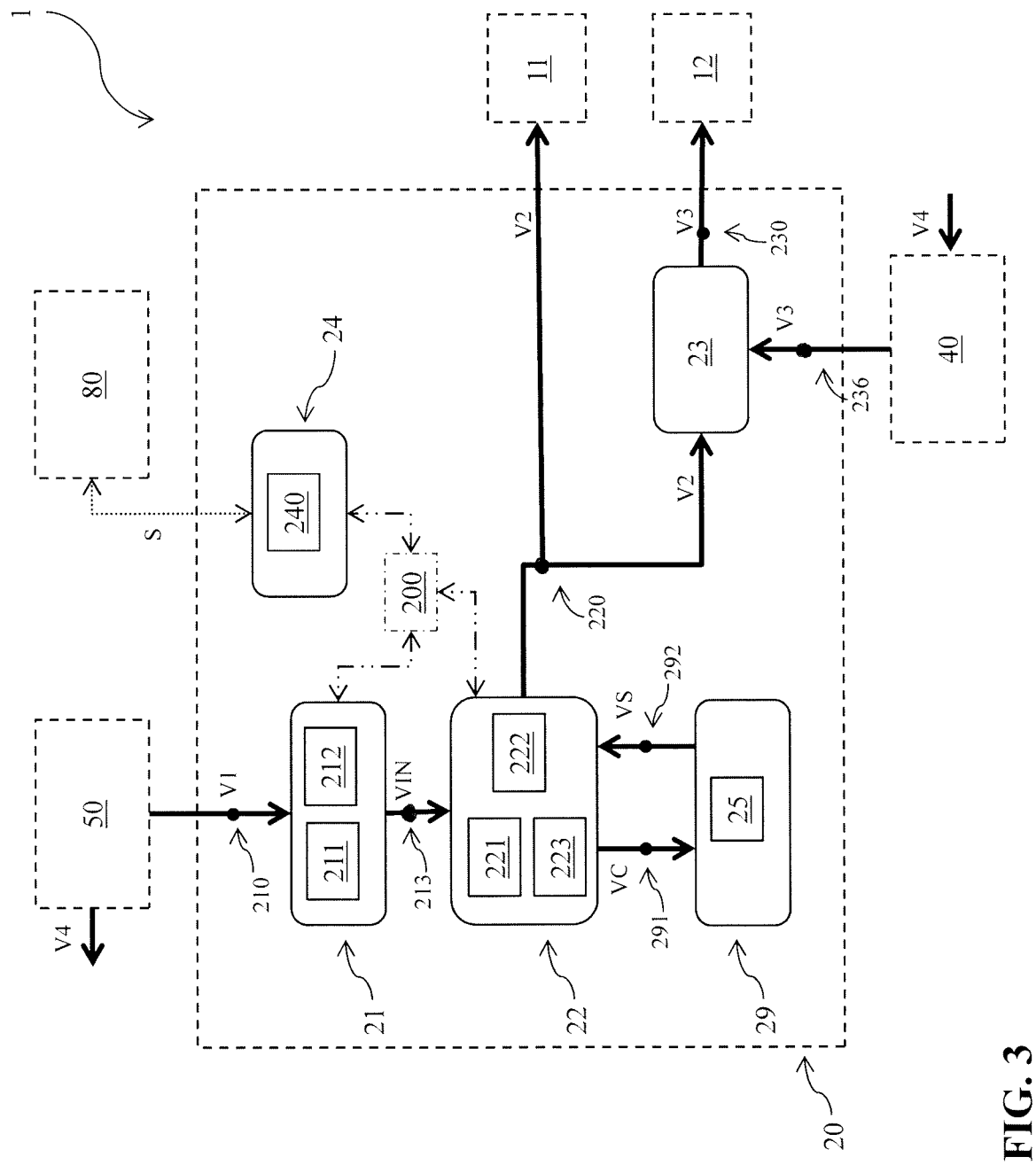
FIGS. 3-4, 4A-4B are block diagrams that schematically show the subsea electric power distribution installation, according to the invention.

In the following detailed description of the invention, identical components are generally indicated by same reference numerals, regardless of whether they are shown in different embodiments. In order to clearly and concisely disclose the invention, the drawings may not necessarily be to scale and certain features of the invention may be shown in a schematic form.

Referring to the cited figures, the present invention is related to a subsea electric power distribution installation 1 for a subsea electric power distribution grid 100.

The subsea electric power distribution grid 100 is adapted to provide a power supply (preferably a MV supply voltage V0) to a subsea facility 600 including one or more electric loads 60.

The subsea electric power distribution grid 100 is electrically connected to a HV power transmission line 300, which is in turn electrically connected to a topside electric power transmission installation 400.

The topside installation 400 may be onshore (e.g. a HV electric power station) or offshore (a platform or ship).

The subsea electric power distribution grid 100 comprises at least a HV/MV transformer 51 to transform the HV supply voltage received from the HV power transmission line 300 into a MV supply voltage V0 to feed the electric loads 60.

The subsea electric power distribution grid 100 comprises at least a MV/LV transformer 52 to transform the MV supply voltage V0 made available by the transformer 51 into a LV supply voltage V1 to feed LV components of the subsea installation 100.

From an electrical point of view, the upstream portions (with respect to the normal electric power flow) of the subsea electric power distribution grid 100 (e.g. including the transformers 51-52) form an electric power source 50 capable of making available both MV and LV supply voltages V0, V1 to further portions of the subsea electric power distribution grid 100 and to the electric loads 60.

The subsea electric power distribution grid 100 comprises the subsea electric power distribution installation 1 intended to be electrically connected between the electric power source 50 and the electric loads 60.

The subsea electric power distribution installation 1 comprises a switchgear 10 including one or more MV switching apparatuses 70 (which may be of known type) electrically connected with the electric power source 50 and the electric loads 60 to switch the MV power supply V0 to these latter.

In principle, the MV switching apparatuses 70 may be of any type and may include, for example, MV circuit breakers, contactors, disconnectors, reclosers or the like.

Preferably, the switching apparatuses 70 comprise MV vacuum circuit breakers having electric poles provided with mobile contacts that can be actuated by suitable actuators.

Preferably, said actuators are electromagnetic actuators.

In principle, the number of the switching apparatuses 70 may vary according to the needs. In the embodiments shown in the cited figures, the electric power distribution installation 1 comprises three switching apparatuses for evident reasons of electric balancing.

The subsea electric power distribution installation 1 comprises also electronic equipment 11, 12 (which may be of known type) operatively associated with the switching apparatuses 70 for managing the operation of this latter.

The electronic equipment 11, 12 is conveniently configured to receive a LV power supply.

As an example, such electronic equipment may comprise one or more power & control units 11 configured to drive the switching apparatuses 70 and/or one or more protection & control units 12 operatively associated with the switching apparatuses 70 to manage the operation of these latter.

According to the invention, the electric power distribution installation 1 comprises at least a centralized energy storage unit 20 adapted to store electric energy to feed the electronic equipment 11, 12 operatively associated to the centralized storage unit 20.

For the sake of clarity, the energy storage unit 20 is defined as "centralized" as it is configured to feed, in a shared way, multiple pieces of the electronic equipment 11, 12 of the subsea electric power distribution installation 1, which may be of same or different type.

In the following, the present invention will be described with reference to preferred embodiments in which the subsea switchgear 10 comprises a single centralized energy storage unit 20 to feed the whole electronic equipment of the switchgear.

However, embodiments of the invention are possible in which the subsea electric power distribution installation 1 comprises multiple centralized energy storage units 20, each dedicated to feed a corresponding cluster of electronic equipment of the switchgear. In any event, the arrangement of one or more centralized energy storage units 20 in a subsea electric power distribution installation represents a technical solution in contrast with currently available arrangements, which basically implements a distributed one-to-one storage and management of the electric energy to feed the electronic equipment of the subsea switchgear, according to which each piece of electronic equipment is basically provided with its own storage battery.

At it will clearly emerge from the following description, the solution proposed by the invention allows achieving a remarkable simplification of the physical structure of the subsea electric power distribution installation, which may be arranged according to a modular approach, thereby improving its overall reliability and remarkably facilitating possible maintenance interventions.

According to the invention, the centralized energy storage unit 20 includes one or more storing devices 25 for storing electric energy.

The storing devices 25 are advantageously configured in such a way to store the electric energy (e.g. up to 20000 Joule) needed for feeding the electronic equipment 11, 12 operatively associated to the centralized storage unit 20.

Preferably, the storing devices 25 are storing capacitors.

The adoption of a capacitive storage of electric energy, instead of using batteries, represents a another important aspect of the invention, which allows fully overcoming the traditional reliability problems deriving from the use of batteries in a subsea environment (e.g. limited operating life, high sensitivity to vibrations and temperature variations, and the like).

The centralized energy storage unit 20 is electrically connected with the electric power source 50 and is adapted to receive electric power at LV level from this latter to charge the storing devices 25.

The centralized energy storage unit 20 is electrically connected with the electronic equipment 11, 12 and is adapted to feed said electronic equipment with electric power at LV level, which is absorbed from the storing devices 25, in other words by consuming electric power that is provided by the storing devices 25.

More particularly, the centralized energy storage unit 20 is adapted to provide a LV electric power supply V2, V3 (which is preferably adjustable) to the electronic equipment 11, 12.

According to an embodiment of the invention, the centralized energy storage unit 20 comprises a plurality of electronic modules electrically connected in cascade.

Preferably, the centralized energy storage unit 20 comprises an energy storage module 29 including the storing devices 25.

Preferably, the energy storage module 29 comprises an input 291, at which it receives a charging voltage VC (conveniently of DC type) having values suitable to charge the storing devices 25, and an output 292, at which it provides a fourth voltage VS that may substantially coincide with the charging voltage VC when the storing devices 25 are fully charged.

Preferably, the centralized energy storage unit 20 comprises a first electronic module 21 configured to receive the first feeding voltage V1 (conveniently of AC type, e.g. 240V) from the electric power source 50 and provide an input voltage VIN, which is preferably adjustable and conveniently of DC type.

Preferably, the first electronic module 21 comprises an input 210, at which it is electrically connected with the electric power source 50 to receive the feeding voltage V1, and an output 213, at which it provides the input voltage VIN.

Preferably, the first electronic module 21 comprises a rectifying circuit 211 (e.g. having a diode bridge configuration) electrically connected in cascade with the electric power source 50 to receive and rectify the feeding voltage V1.

Preferably, the first electronic module 21 comprises a first DC/DC converter 212 electrically connected in cascade with the rectifying circuit 211 to receive the rectified voltage provided by this latter and provide the input voltage VIN.

Preferably, the centralized energy storage unit 20 comprises a second electronic module 22 electrically connected with the first electronic module 21 (at the output 213) and the energy storage module 29 (at the input 291).

Preferably, the second electronic module 22 is configured to receive the input voltage VIN from the first electronic module 21 and provide the charging voltage VC to the energy storage module 29.

Preferably, the second electronic module 22 is configured to receive the fourth voltage VS (at the output 292 of the energy storage module 29) and it comprises an output 220, at which it provides the second feeding voltage V2 (e.g. 100V-430V).

Preferably, the second electronic module 22 comprises a second DC/DC step-down converter 221 electrically connected with the output 213 of the first electronic module 21 to receive the input voltage VIN and provide the charging voltage VC (at the input 291 of the energy storage module 29).

Preferably, the second electronic module 22 comprises an electronic supervision module 223 to diagnostic the operation of the storing devices 25 and to command the connection or disconnection of said storing devices 25 with or from the converter 221.

Preferably, the second electronic module 22 comprises an electronic output module 222 electrically connected with the output 292 of the energy storage module 29 to receive the fourth voltage VS and provide the second feeding voltage V2 at the output 220.

According to a preferred embodiment of the invention, the second electronic module 22 is electrically connected with first electronic equipment 11 (e.g. at the output 220) to feed this latter with the second feeding voltage V2.

Preferably, the first electronic equipment 11 comprises a plurality of power & control units of the subsea switchgear 10, which are operatively associated with the switching apparatuses 70.

Preferably, the power & control units 11 are configured to drive the switching apparatuses 70 to operate these latter according to the needs.

As an example, referring to an embodiment in which the switching apparatuses 70 are vacuum circuit breakers provided with electro-magnetic actuators, the power and control units 11 are conveniently configured to properly drive said electro-magnetic actuators.

According to an embodiment of the invention, the centralized energy storage unit 20 comprises a third electronic module 23 configured to provide a third feeding voltage V3 (preferably adjustable and conveniently of DC type).

Preferably, the third feeding voltage V3 (e.g. 24V) is lower than the second feeding voltage V2.

Preferably, the third electronic module 23 is electrically connected with the second electronic module 22 (namely with the output 220 of this latter) and with at least an auxiliary power supply unit 40 and second electronic equipment 12 of the electric power distribution installation 1.

Preferably, the auxiliary power supply unit 40 is electrically connected with the electric power source 50 and is configured to receive a feeding voltage V4 from this latter and provide in turn a feeding voltage corresponding to the third feeding voltage V3.

Preferably, the second electronic equipment 12 of the subsea switchgear 10 comprises one or more protection & control units operatively associated with the switching apparatuses 70 to manage the operation of these latter. As an example, the protection & control units 12 may protection relays or other IEDs (Intelligent Electronic Devices) of different type.

Preferably, the third electronic module 23 provides the third feeding voltage V3 at an output 230, which is conveniently electrically connected with the second electronic equipment 12.

Preferably, the third electronic module 23 comprises a first electronic stage 231 electrically connected in cascade with the second electronic module 22 and configured to receive the second feeding voltage V2 from the second electronic module 22 (at the output 220) and provide the third feeding voltage V3 at an electric node 235.

Preferably, the first electronic stage 231 comprises a fourth DC/DC step-down converter 2310 configured to receive the second feeding voltage V2 from this latter and provide the third feeding voltage V3.

Preferably, the third electronic module 23 comprises a second electronic stage 232 electrically connected with the first electronic stage 231 (at the electric node 235), with the auxiliary power supply unit 40 (at an input 236) and the second electronic equipment 12 (at the output 220).

Preferably, the second electronic stage 232 is configured to reversibly switch between a first circuit configuration A and a second circuit configuration B.

When the auxiliary power supply unit 40 is active, the second electronic stage 232 switches in the first circuit configuration A whereas, when the auxiliary power supply unit 40 is inactive, the second electronic stage 232 switches in the second circuit configuration B.

When it takes first circuit configuration A, the second electronic stage 232 receives the feeding voltage V3 from the auxiliary power supply unit 40 and provides the third feeding voltage V3 to the second equipment 12.

When it takes second circuit configuration B, the second electronic stage 232 receives the feeding voltage V3 from the first electronic stage 231 and provides the third feeding voltage V3 to the second equipment 12.

Preferably, the second electronic stage 232 comprises a switching circuit 2320 operating as an OR logic port.

Preferably, the switching circuit 2320 comprises first and second diodes 2321, 2322 having cathodes electrically connected with the output 230 and anodes electrically connected with the first electronic stage 231 (at the electric node 235) and the auxiliary power supply unit 40 (at the input 236), respectively.

Figure 4:
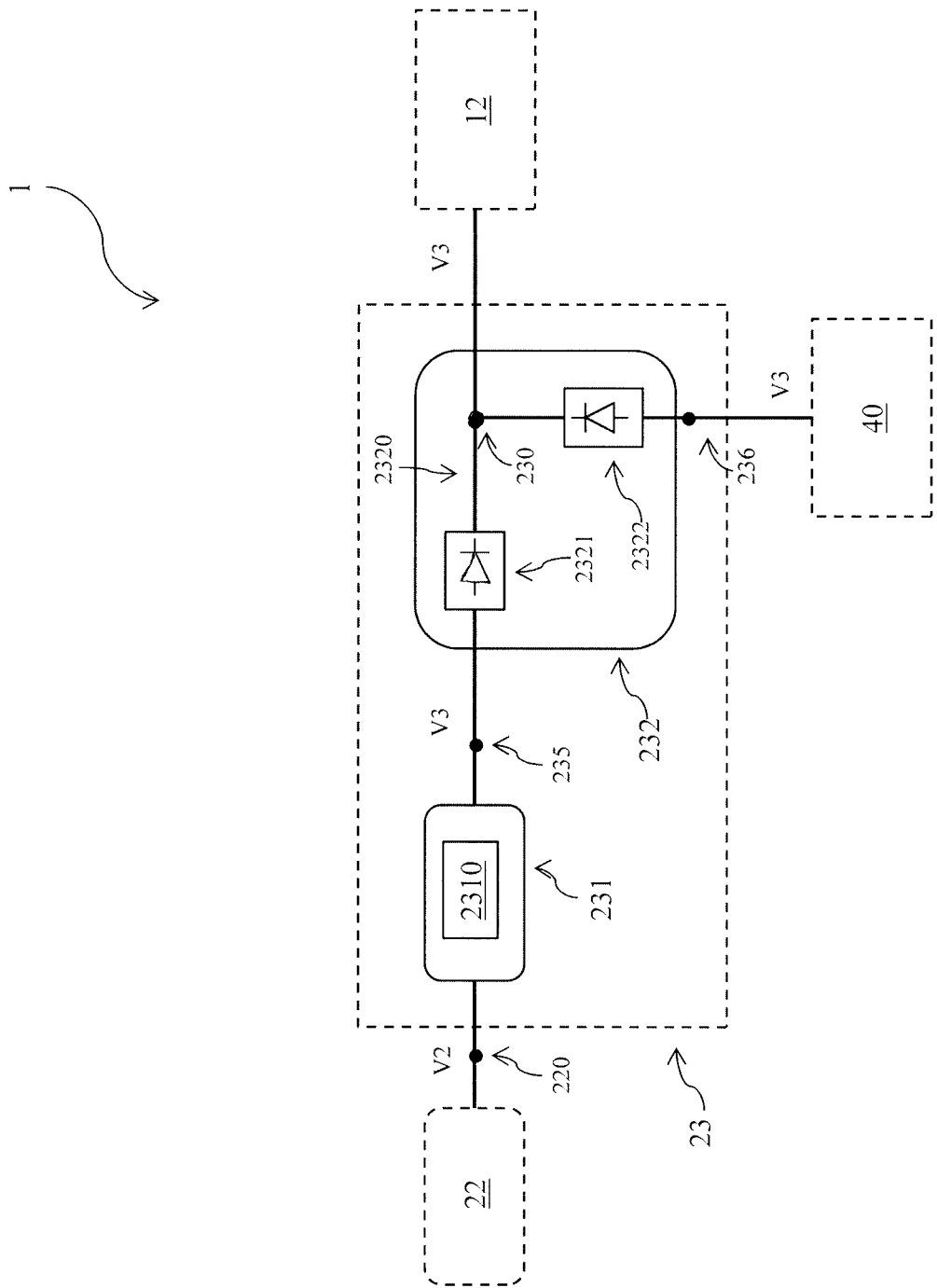
Figure 4A:
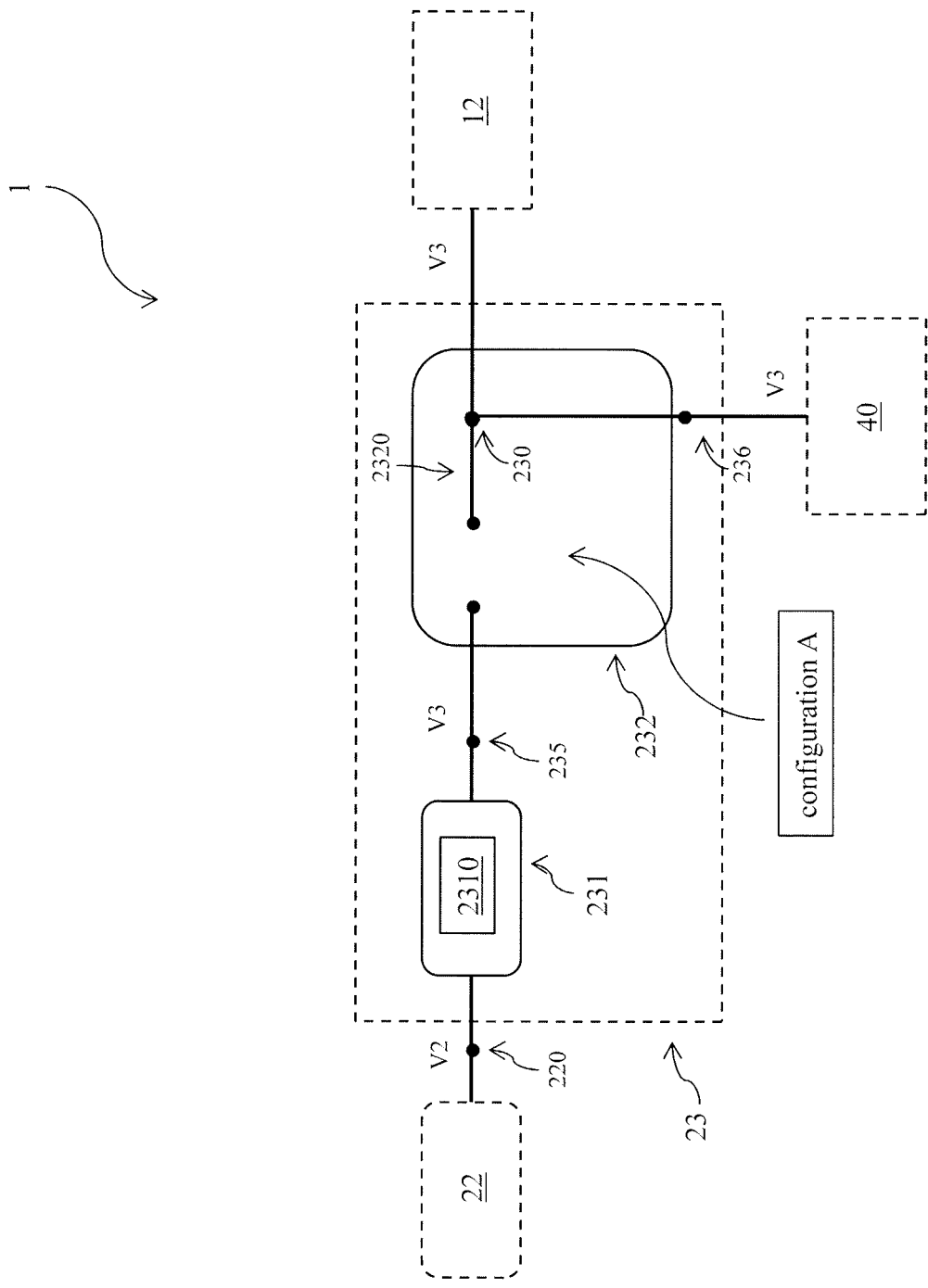

When the auxiliary power supply unit 40 is active, the first diode 2321 switches in conduction state whereas the second diode 2322 switches in interdiction state. The second electronic stage 232 takes the first circuit configuration A according to which the output 230 is electrically connected with the power supply 40 and is disconnected from the first electronic stage 231. The output 230 of the second electronic stage 232 thus receives the third feeding voltage V3 directly from the power supply 40 (FIG. 4A).

Figure 4B:
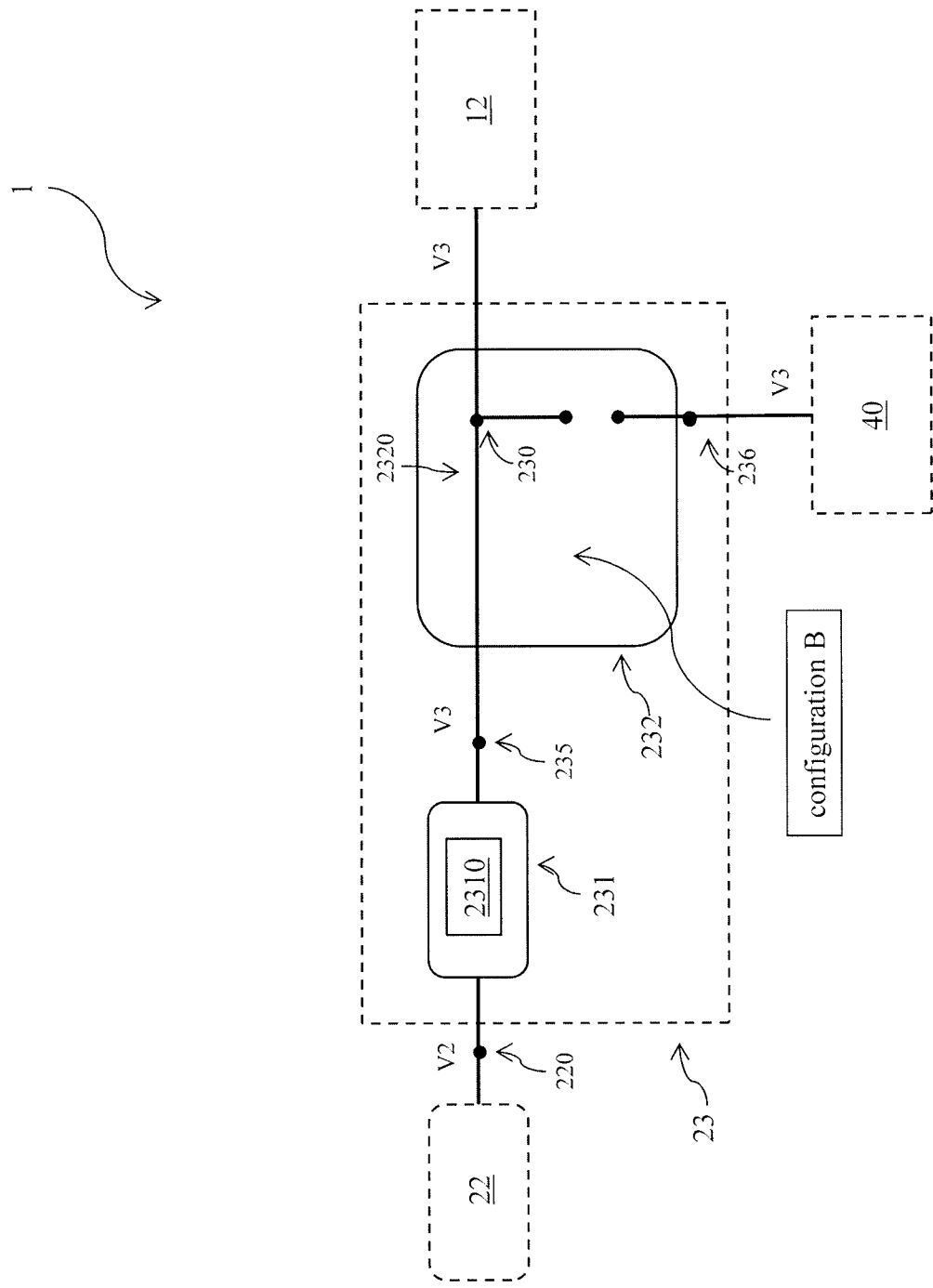
Figure 6:
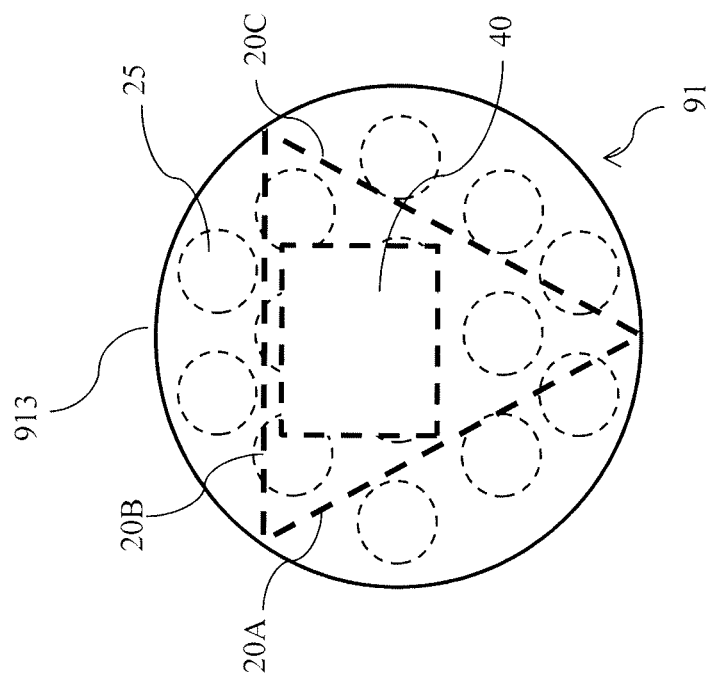
Figure 5:
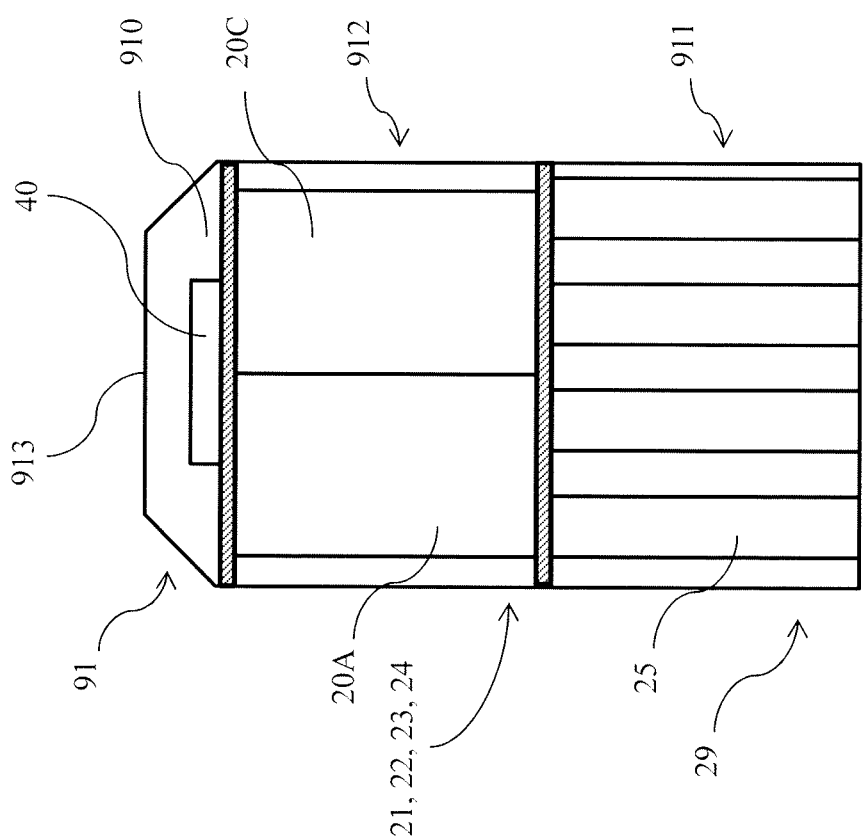
Figure 9:
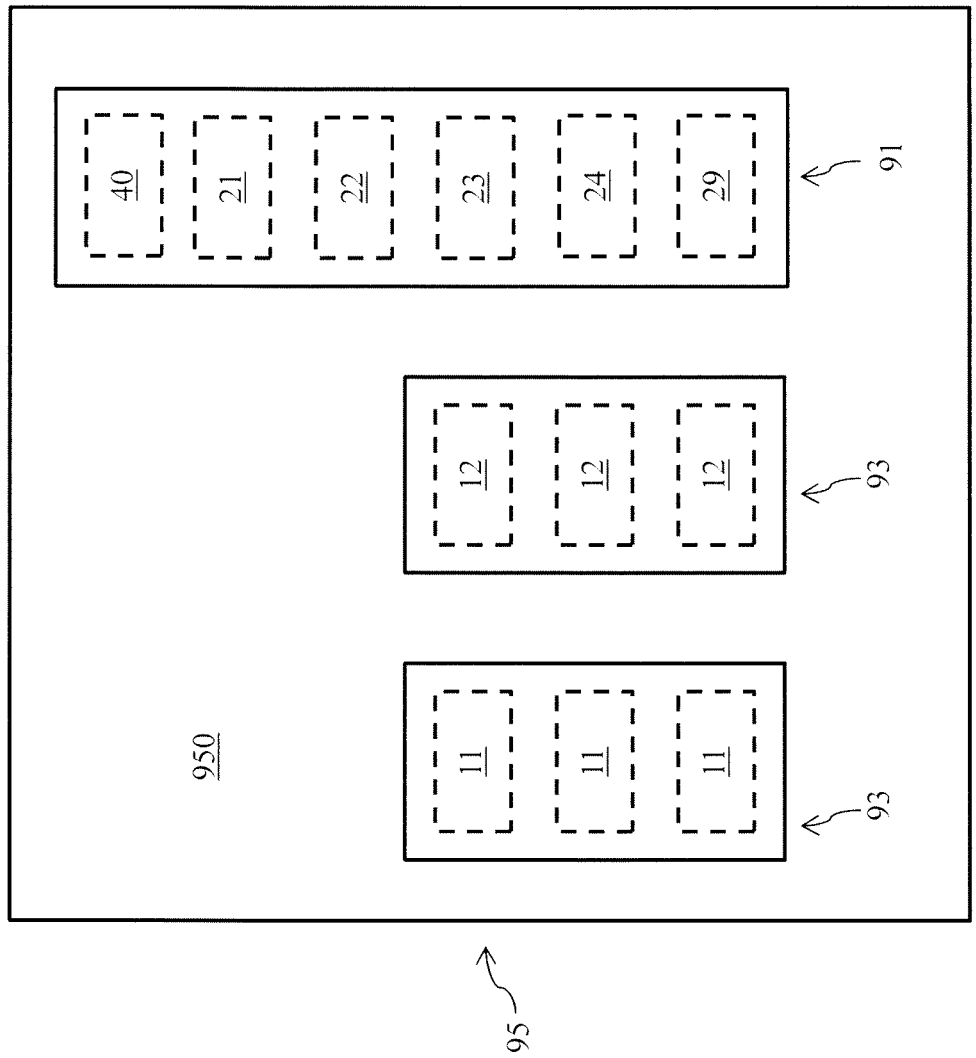
FIG. 9 is a block diagram that schematically shows a retrievable subsea containing structure for the subsea electric power distribution installation, according to the invention.

When the auxiliary power supply unit 40 is inactive (e.g. due to a failure), the first diode 2321 switches in interdiction state whereas the second diode 2322 switches in conduction state. The second electronic stage 232 takes the second circuit configuration B, according to which the output 230 is electrically connected with the first electronic stage 231 and is disconnected from the auxiliary power supply unit 40. The output 230 of the second electronic stage 232 thus receives the third feeding voltage V3 directly from the first electronic stage 231 (FIG. 4B).

The embodiment described above is particularly advantageous as the centralized energy storage unit 20 is capable to provide, in case of emergency, a power supply to electronic equipment (e.g. the protection & control units) 12, which is normally fed by an auxiliary power supply (e.g. the auxiliary power supply unit 40).

As an example, the centralized energy storage unit 20 can provide the electronic equipment 12 with the energy sufficient to properly set the switching apparatuses in a safe state and communicate with an overlaying control system, in case of failure of the auxiliary power supply unit 40.

The subsea switchgear 1 thus offers more reliable performances in case of voltage dips or failures.

It is evidenced how the centralized energy storage unit 20 is capable of implementing the above functionalities without incurring the drawbacks (e.g. limited reliability and operating life of the battery packs) characterising the UPS-based solutions generally adopted in traditional subsea switchgears.

Preferably, the centralized energy storage unit 20 comprises a fourth electronic module 24 configured to exchange data or control signals S with at least a control unit 80 of the subsea electric power distribution installation 1.

Preferably, the fourth electronic module 24 comprises a communication interface 240 configured to communicate with one or more the electronic modules 21, 22, 23 of the centralized energy storage unit 20 and with the control unit 80 according to communication protocols, which may be of known type.

Preferably, the centralized energy storage unit 20 comprises processing resources 200, which may include one or more digital processing devices (e.g. microprocessors or DSPs) capable of storing and executing one or more computer programs to manage the functionalities of the electronic modules 21-24.

The processing resources 200 may be collected in a single processing device physically included in an electronic module 21-24 or may be distributed among different processing devices physically positioned in one or more electronic modules.

Preferably, the electronic modules 21-24 of the centralized energy storage unit 20 are physically mounted on one or more electronic boards 20A, 20B, 20C.

To this aim, known electronic circuit assembling techniques may be conveniently adopted.

As an example, the electronic modules 21, 24 may be mounted on a dedicated electronic board 20A, the electronic module 22 may be mounted on a dedicated electronic board 20B and the electronic module 23 24 may be mounted on a dedicated electronic board 20C.

Other solutions are obviously possible to the skilled person.

As they are intended to be installed at deep water level, the components of the subsea installation 100 (e.g. the transformers 51-52, the electric power distribution installation 1, etc.) are exposed to pressures up to hundreds of bar (e.g. up to 300 bar at a depth of 3000 m).

To protect the components of the subsea electric power distribution installation 1 (e.g. the switching apparatuses 70, the centralized storage unit, the electronic equipment 11-12, etc.) from the corrosive environment in which they are installed and deal with the high pressures to which they are exposed, pressure resistant subsea containers are arranged to accommodate said components at a predefined pressure (e.g. the atmospheric pressure).

Conveniently, said subsea containers are properly designed to withstand the high differential pressure between the subsea environment and their inside.

According to an embodiment of the invention, the electric power distribution installation 1 comprises a first subsea container 91 having an outer shaped enclosure 913 adapted to define an internal volume 910 having a predefined internal pressure (e.g. the atmospheric pressure).

Preferably, the outer enclosure 913 of the subsea container 91 has a suitable thickness and shape (preferably cylindrical) to better withstand the environmental pressure and reduce the overall size.

Conveniently, the subsea container 91 is adapted to accommodate the centralized energy storage unit 20 in the internal volume 910.

Preferably, the subsea container 91 comprises a storage section 911 for accommodating the energy storage module 29, in particular the storing devices 25.

Preferably, the subsea container 91 comprises an electronic section 912 for accommodating the electronic boards 20A, 20B, 20C on which the electronic modules 21-24 are mounted.

In FIG. 7, the electronic section 912 is shown as overlapped to the storage section 911 with reference to the normal installation position of the subsea container 91. However, different arrangements are possible.

Conveniently, the electronic boards 20A, 20B, 20C may be arranged (e.g. according to a triangular-prism configuration) within the electronic section 912 of the subsea container 91.

Evidently, these combined solutions, as shown in the embodiments of FIGS. 5-8, allow reducing the overall size of the subsea container 91.

Preferably, the subsea container 91 may be used to accommodate further electronic circuits or devices not being part of the centralized energy storage unit 20, e.g. an auxiliary electric power supply unit 40.

Also said further electronic circuits or devices are preferably accommodated in the electronic section 912 of the subsea container 91, e.g. overlapped with the electronic boards 20A, 20B, 20C.

According to some embodiments of the invention (FIGS. 7-8), the subsea container 91 comprises a material 915 (which may be of known type) capable of absorbing hydrogen accommodated in the internal volume 910.

Such a solution is quite advantageous as it allows drastically reducing the presence of hydrogen in the internal volume 910 of the subsea container 91.

As is known hydrogen is normally generated during the operation of capacitive energy storage equipment. The presence of hydrogen within the container 91 would pose severe safety problems when maintenance or dismantling interventions have to be carried out. Furthermore, an internal atmosphere full of hydrogen could generate corrosive composites for the electronic components of the electronic modules 21-24.

The use of hydrogen absorbing material 915 in the internal volume 910 thus provides relevant advantages in terms of safety for operators and in terms of reliability of the centralized energy storage unit 20.

According to the embodiment shown in FIG. 7, the hydrogen absorbing material 915 is positioned at the storage section 911 of the subsea container 91.

As an example, layers of material 915 may be arranged to cover the external envelopes of the storing devices 25.

As a further example, bulk portions of material 915 may be arranged to fill the interstices among the storing devices 25 and the space between these latter and the internal walls of the subsea container 91.

According to the embodiment shown in FIG. 8, the hydrogen absorbing material 915 is positioned at both the storage and electronic sections 911, 912 of the subsea container 91.

As an example, layers of material 915 may be arranged to cover the external envelopes of the storing devices 25 and the internal walls of the subsea container 91 whereas bulk portions of material 915 may be arranged to fill the internal interstices.

Other arrangements of the hydrogen absorbing material 915 are possible according to the needs.

As mentioned above, the arrangement of a centralized energy storage unit 20 to feed electronic equipment 11, 12 of the electric power distribution installation 1 has a remarkable impact of the physical structure of the electric power distribution installation 1.

The provision of a shared centralized power supply for the electronic equipment 11, 12 implies remarkable size savings for said electronic equipment.

Further, the pieces of electronic equipment 11, 12, which are centrally fed by the energy storage unit 20, may be assembled together within dedicated containers.

Preferably, the electric power distribution installation 1 comprises one or more second subsea containers 92 to accommodate the first electronic equipment 11 of the electric power distribution installation 1.

As an example, the electric power distribution installation 1 may comprise a plurality of subsea containers 92, each accommodating a plurality of power & control units 11 operatively associated with the switching apparatuses 70.

Preferably, the electric power distribution installation 1 comprises one or more third subsea containers 93 to accommodate the second electronic equipment 12 of the electric power distribution installation 1.

As an example, the electric power distribution installation 1 may comprise a plurality of subsea containers 93, each accommodating a plurality of protection & control units 11 operatively associated with the switching apparatuses 70.

Preferably, the subsea electric power distribution installation 1 comprises a plurality of subsea containing structures 95, each defining a volume 950, in which a first subsea container 91, a second subsea container 92 and a third subsea container 93 are accommodated.

Preferably, the subsea containing structure 95 is retrievable by suitable topside lifting means.

The arrangement of the subsea containing structures 95 is quite advantageous as it allows intervening (e.g. for installation, replacement or maintenance purposes) on the LV components of the electric power distribution installation 1 (e.g. the energy storage unit 20 or the electronic equipment 11, 12) without involving the MV components of the electric power distribution installation 1 (e.g. the switching apparatuses 70), which in turn can be accommodated in a suitable dedicated containing structure, and vice-versa.

From the above, it is apparent that the arrangement of one or more centralized energy storage units 20 constitutes a key feature of the electric power distribution installation 1, which allows assembling this latter with a modular structure.

The subsea electric power distribution installation 1 has thus a simplified structure with respect to traditional solutions, which can be manufactured at industrial level at competitive costs.

The operative installation of the electric power distribution installation 1 is easier with respect to traditional solutions and as well as the execution of possible maintenance interventions.

The provision of one or more shared centralized power supplies in the subsea electric power distribution installation 1 allows remarkably improving the footprint, size and heat dissipation of the electronic equipment of the switchgear, e.g. of the power & control units intended to drive the switching apparatuses.

Further, as said one or more shared centralized power supplies are of capacitive type, the drawbacks of traditionally used battery storage systems or UPS systems are fully overcome.

The provision of one or more shared power supplies 20 in the subsea electric power distribution installation 1 further allows improving the overall performances of this latter in terms of reliability, even in relation to the behaviour in presence of power supply dips or failures.

The subsea electric power distribution installation, according to the invention, thus conceived may undergo numerous modifications and variants, all coming within the scope of the inventive concept. Moreover, all the component parts described herein may be substituted by other, technically equivalent elements. In practice, the component materials and dimensions of the device may be of any nature, according to needs.

The invention claimed is:

1. A subsea electric power distribution installation comprising:
   one or more MV switching apparatuses electrically connected with an electric power source and one or more electric loads, said switching apparatuses being adapted to switch a MV electric power supply to said electric loads;
   electronic equipment operatively associated with said switching apparatuses for managing the operation of said switching apparatuses, said electronic equipment being configured to receive a LV electric power supply;
   at least a centralized energy storage unit including one or more storing devices for storing electric energy, wherein said centralized energy storage unit is adapted to receive electric power from said electric power source to charge said storing devices, wherein said centralized energy storage unit is adapted to provide an electric power supply (V2, V3) to said electronic equipment by consuming electric power provided by said storing devices,
   wherein said centralized energy storage unit comprises:
   a first electronic module configured to receive a first feeding voltage (V1) from said electric power source and provide an input voltage (VIN);
   an energy storage module comprising said storing devices; and
   a second electronic module configured to receive said input voltage (VIN) from said first electronic module and provide a charging voltage (VC) to said energy storage module to charge said storing devices, said second electronic module being configured to provide a second feeding voltage (VH2) to said electronic equipment consuming electric power provided by said storing devices, and
   wherein said centralized energy storage unit comprises a third electronic module comprising:
   a first electronic stage configured to receive said second feeding voltage (V2) from said second electronic module and provide a third feeding voltage (V3);
   a second electronic stage electrically connected with at least an auxiliary power supply unit and second equipment of said subsea electric power distribution installation, wherein said second electronic stage is configured to reversibly switch between a first circuit configuration (A), at which second electronic stage receives said third feeding voltage from said auxiliary power supply unit and provides said third feeding voltage to said second electronic equipment, when said auxiliary power supply unit is active, and a second circuit configuration (B), at which said second electronic stage receives said third feeding voltage from said first electronic stage and provides said third feeding voltage to said second electronic equipment, when said auxiliary power supply unit is inactive.

2. The subsea electric power distribution installation, according to claim 1, wherein said second electronic module is electrically connected with first electronic equipment of said subsea electric power distribution installation to feed said first electronic equipment with said second feeding voltage (V2).

3. The subsea electric power distribution installation, according to claim 2, wherein said first electronic equipment comprises a plurality of power and control units operatively associated with said switching apparatuses.

4. The subsea electric power distribution installation, according to claim 1, wherein said second electronic equipment comprises one or more protection and control units operatively associated with said switching apparatuses.

5. The subsea electric power distribution installation, according to claim 1, wherein said third feeding voltage (V3) is lower than said second feeding voltage (V2).

6. The subsea electric power distribution installation, according to claim 1, wherein said centralized energy storage unit comprises a fourth electronic module configured to exchange data or control signals (S) with at least a control unit of said subsea electric power distribution installation.

7. The subsea electric power distribution installation, according to claim 1, further comprising a first subsea container having an outer enclosure adapted to define an internal volume with a predefined pressure, wherein said centralized energy storage unit is accommodated in the internal volume of said first subsea container.

8. The subsea electric power distribution installation, according to claim 7, wherein said first subsea container comprises a storage section for accommodating said storing devices and an electronic section for accommodating one or more electronic boards on which one or more of said electronic modules are mounted.

9. The subsea electric power distribution installation, according to claim 7, wherein said first subsea container comprises a material capable of absorbing hydrogen, said material being accommodated in the internal volume of said subsea container.

10. The subsea electric power distribution installation, according to claim 7, further comprising a retrievable subsea containing structure for accommodating said first subsea container and second and third containers, in which said electronic equipment is accommodated.

11. A subsea electric power distribution grid comprising a subsea electric power distribution installation, according to claim 1.

12. A subsea electric power distribution installation comprising:
one or more MV switching apparatuses electrically connected with an electric power source and one or more electric loads, said switching apparatuses being adapted to switch a MV electric power supply to said electric loads;
electronic equipment operatively associated with said switching apparatuses for managing the operation of said switching apparatuses, said electronic equipment being configured to receive a LV electric power supply;
at least a centralized energy storage unit including one or more storing devices for storing electric energy, wherein said centralized energy storage unit is adapted to receive electric power from said electric power source to charge said storing devices, wherein said centralized energy storage unit is adapted to provide an electric power supply (V2, V3) to said electronic equipment by consuming electric power provided by said storing devices,
wherein said centralized energy storage unit comprises:
a first electronic module configured to receive a first feeding voltage (V1) from said electric power source and provide an input voltage (VIN);
an energy storage module comprising said storing devices; and
a second electronic module configured to receive said input voltage (VIN) from said first electronic module and provide a charging voltage (VC) to said energy storage module to charge said storing devices, said second electronic module being configured to provide a second feeding voltage (VH2) to said electronic equipment consuming electric power provided by said storing devices,
wherein said second electronic module is electrically connected with first electronic equipment of said subsea electric power distribution installation to feed said first electronic equipment with said second feeding voltage (V2), and
wherein said centralized energy storage unit comprises a third electronic module comprising:
a first electronic stage configured to receive said second feeding voltage (V2) from said second electronic module and provide a third feeding voltage (V3);
a second electronic stage electrically connected with at least an auxiliary power supply unit and second equipment of said subsea electric power distribution installation, wherein said second electronic stage is configured to reversibly switch between a first circuit configuration (A), at which second electronic stage receives said third feeding voltage from said auxiliary power supply unit and provides said third feeding voltage to said second electronic equipment, when said auxiliary power supply unit is active, and a second circuit configuration (B), at which said second electronic stage receives said third feeding voltage from said first electronic stage and provides said third feeding voltage to said second electronic equipment, when said auxiliary power supply unit is inactive.

13. The subsea electric power distribution installation, according to claim 12,
wherein said centralized storage unit is accommodated with a subsea container having an outer enclosure adapted to define an internal volume with a predefined pressure.

14. The centralized energy storage unit, according to claim 13, further comprising a material capable of absorbing hydrogen, said material being accommodated in the internal volume of said subsea container.

15. A subsea electric power distribution installation comprising:
one or more MV switching apparatuses electrically connected with an electric power source and one or more electric loads, said switching apparatuses being adapted to switch a MV electric power supply to said electric loads;
electronic equipment operatively associated with said switching apparatuses for managing the operation of said switching apparatuses, said electronic equipment being configured to receive a LV electric power supply;
at least a centralized energy storage unit including one or more storing devices for storing electric energy, wherein said centralized energy storage unit is adapted to receive electric power from said electric power source to charge said storing devices, wherein said centralized energy storage unit is adapted to provide an electric power supply (V2, V3) to said electronic equipment by consuming electric power provided by said storing devices,
wherein said centralized energy storage unit comprises:
a first electronic module configured to receive a first feeding voltage (V1) from said electric power source and provide an input voltage (VIN);

an energy storage module comprising said storing devices; and a second electronic module configured to receive said input voltage (VIN) from said first electronic module and provide a charging voltage (VC) to said energy storage module to charge said storing devices, said second electronic module being configured to provide a second feeding voltage (VH2) to said electronic equipment consuming electric power provided by said storing devices, wherein said second electronic module is electrically connected with first electronic equipment of said subsea electric power distribution installation to feed said first electronic equipment with said second feeding voltage (V2), wherein said first electronic equipment comprises a plurality of power and control units operatively associated with said switching apparatuses, and wherein said centralized energy storage unit comprises a third electronic module comprising:

a first electronic stage configured to receive said second feeding voltage (V2) from said second electronic module and provide a third feeding voltage (V3);

a second electronic stage electrically connected with at least an auxiliary power supply unit and second equipment of said subsea electric power distribution installation, wherein said second electronic stage is configured to reversibly switch between a first circuit configuration (A), at which second electronic stage receives said third feeding voltage from said auxiliary power supply unit and provides said third feeding voltage to said second electronic equipment, when said auxiliary power supply unit is active, and a second circuit configuration (B), at which said second electronic stage receives said third feeding voltage from said first electronic stage and provides said third feeding voltage to said second electronic equipment, when said auxiliary power supply unit is inactive.

16. The subsea electric power distribution installation, according to claim 12, wherein said second electronic equipment comprises one or more protection and control units operatively associated with said switching apparatuses.

17. The subsea electric power distribution installation, according to claim 15, wherein said second electronic equipment comprises one or more protection and control units operatively associated with said switching apparatuses.

18. The subsea electric power distribution installation, according to claim 2, wherein said centralized energy storage unit comprises a fourth electronic module configured to exchange data or control signals (S) with at least a control unit of said subsea electric power distribution installation.

* * * * *